United States Patent [19]
Tuttle et al.

[11] Patent Number: 5,824,383
[45] Date of Patent: Oct. 20, 1998

[54] METHODS OF SECURING SPLICES IN CURABLE RUBBER ARTICLES

[75] Inventors: James Robert Tuttle, Hudson; Frederick Forbes Vannan, Jr., Clinton; William James Head, Ravenna, all of Ohio

[73] Assignee: The Goodyear Tire & Rubber Company, Akron, Ohio

[21] Appl. No.: 738,215

[22] Filed: Oct. 25, 1996

[51] Int. Cl.⁶ ...................................................... B32B 3/06
[52] U.S. Cl. ............................ 428/60; 428/61; 156/157; 156/304.3; 156/304.6
[58] Field of Search ................................... 156/134, 157, 156/304.3, 304.6; 428/60, 61

[56] References Cited

U.S. PATENT DOCUMENTS

| | | | |
|---|---|---|---|
| 3,620,869 | 11/1971 | Stump et al. | 156/191 X |
| 3,650,874 | 3/1972 | Job et al. | 161/217 |
| 4,227,956 | 10/1980 | Honda et al. | 156/334 |
| 4,443,291 | 4/1984 | Reed | 156/505 X |
| 4,463,146 | 7/1984 | Donbar et al. | 526/142 |
| 4,790,365 | 12/1988 | Sandstrom et al. | 152/510 |
| 4,966,213 | 10/1990 | Kawaguchi et al. | 152/504 |
| 5,011,896 | 4/1991 | Bell et al. | 526/92 |
| 5,049,220 | 9/1991 | Gartland et al. | 156/116 |
| 5,058,647 | 10/1991 | Gartland et al. | 152/524 |
| 5,160,383 | 11/1992 | Gartland et al. | 152/510 |
| 5,278,263 | 1/1994 | Burroway | 526/94 |
| 5,283,294 | 2/1994 | Hsu et al. | 525/247 |
| 5,307,850 | 5/1994 | Halasa et al. | 152/209 |
| 5,405,816 | 4/1995 | Burroway | 502/108 |
| 5,437,751 | 8/1995 | Hirano et al. | 156/134 |

FOREIGN PATENT DOCUMENTS

| | | | |
|---|---|---|---|
| 0162030 | 9/1984 | Japan | B29H 5/01 |
| 0082330 | 5/1985 | Japan | B29C 65/42 |
| 1079051 | 8/1967 | United Kingdom | C08F 3/02 |
| 1144167 | 3/1969 | United Kingdom | B32B 25/00 |

*Primary Examiner*—Mark A. Osele
*Attorney, Agent, or Firm*—Bruce J. Hendricks

[57] ABSTRACT

A method for securing splices in uncured rubber articles prior to vulcanization and secured splices resulting therefrom. The method includes covering a splice and two ends of uncured rubber with syndiotactic 1,2-polybutadiene, adhering the syndiotactic 1,2-polybutadiene to the uncured rubber adjacent to the splice, and curing the rubber. The rubber compound to which the syndiotactic 1,2-polybutadiene is adhered does not have to contain syndiotactic 1,2-polybutadiene. In addition, because the syndiotactic 1,2-polybutadiene is preferably melted into the rubber compound, there are no uniformity problems caused by the additional layer over the splice.

12 Claims, 1 Drawing Sheet

METHODS OF SECURING SPLICES IN CURABLE RUBBER ARTICLES

FIELD OF THE INVENTION

The invention is related to securing splices using syndiotactic 1,2-polybutadiene and secured splices resulting therefrom. More specifically, the invention is directed toward using syndiotactic 1,2-polybutadiene to secure splices in curable rubber articles and secured splices resulting therefrom.

BACKGROUND OF THE INVENTION

Many rubber articles are made from extruded, calendered, or molded components whose ends are adjoined to form a continuous surface. Each set of adjoined ends is referred to as a splice.

Splices are a well-known source of uniformity problems in curable rubber articles. Splices tend to induce non-uniformities in rubber articles that can result in inconsistent product performance. Splices tend to be the most likely location for failures in rubber articles because the ends can separate, which leaves a section in the rubber article that has less rubber than in other parts of the rubber article.

Attempts have been made to prevent splice separation for the useful life of a rubber article. These attempts typically include using a hydrocarbon-based adhesive solvent or cement to secure a splice. For example, skived tread splices are typically secured using a hydrocarbon-based rubber solvent or cement. However, hydrocarbon cements can be hazardous to human health and the environment. It can also be difficult to use a solvent or cement to secure a butt splice (i.e, a splice in which there is no rubber overlap at the adjoining location), which is used in many types of rubber articles.

There is a need for an environmentally safe method for securing a splice in a curable rubber article without adversely effecting the uniformity and useful life of the rubber article. The method should also be effective for all types of splices.

SUMMARY OF THE INVENTION

The invention is directed toward methods of securing a splice in a curable rubber article and toward splices secured using these methods. As used herein, the term "curable rubber article" refers to an article made from a compound containing one or more types of rubber having double bonds therein and being sulfur-curable.

Applicants have discovered that by covering splices in curable rubber articles with a relatively thin (i.e., less than about 0.20 inch (5 mm)) amount of syndiotactic 1,2-polybutadiene, preferably in layer or sheet form and having a melting point of less than about 175° C., that splice separation can be prevented for the life of the rubber article. Having this extra layer over the splice area tends not to affect the uniformity of the rubber article, because the syndiotactic 1,2-polybutadiene layer melts into the rubber article during vulcanization.

Furthermore, the syndiotactic 1,2-polybutadiene is crosslinked with the rubber article during vulcanization. Thus, the layer of syndiotactic 1,2-polybutadiene does not create a significant size bulge in the rubber article above splices secured using methods of the invention. Significant size bulges in a curable rubber article can be a source of uniformity problems. In addition, rubber compounds used to make rubber articles do not have to contain syndiotactic 1,2-polybutadiene for methods of the invention to be useful or for splices resulting from methods of the invention to be secure.

Methods of the invention include covering a splice and two ends of uncured rubber in a curable rubber article with syndiotactic 1,2-polybutadiene, and adhering the syndiotactic 1,2-polybutadiene to the uncured rubber. Typically, the syndiotactic 1,2-polybutadiene is adhered to the uncured rubber using heat and pressure. Preferably, the syndiotactic 1,2-polybutadiene is melted on the uncured rubber at a temperature of at least about 150° C. and not greater than about 175° C. and under enough pressure to adhere the syndiotactic 1,2-polybutadiene to the compound. Generally, the melt process is performed in less than about 10 seconds. These covering and adhering processes take place prior to vulcanization of the rubber article. The curable rubber article having the syndiotactic 1,2-polybutadiene therein is subsequently cured using methods known in the art.

The preferred syndiotactic 1,2-polybutadiene generally has a relatively low melting point that approximates the temperature that the rubber article reaches near the end of its cure cycle. Syndiotactic 1,2-polybutadiene having this approximate melting point tends not to remelt prior to the latter portion of the cure cycle. If the syndiotactic 1,2-polybutadiene tends to melt prior to the latter part of the cure cycle, then the splice is more likely to come apart before vulcanization. Preferably, its melting point is not greater than about 175° C. and is at least about 150° C. The syndiotactic 1,2-polybutadiene used to cover the splices is typically in a layer or sheet form that is at least about 0.005 of an inch (0.13 mm) thick and not greater than about 0.20 of an inch (5 mm) thick. Splices resulting from methods of the invention are usually secure for the useful life of the rubber article. The methods of the invention and splices resulting therefrom are applicable to any type of splice, including butt and skived splices.

DESCRIPTION OF PREFERRED EMBODIMENTS

Figure 1:
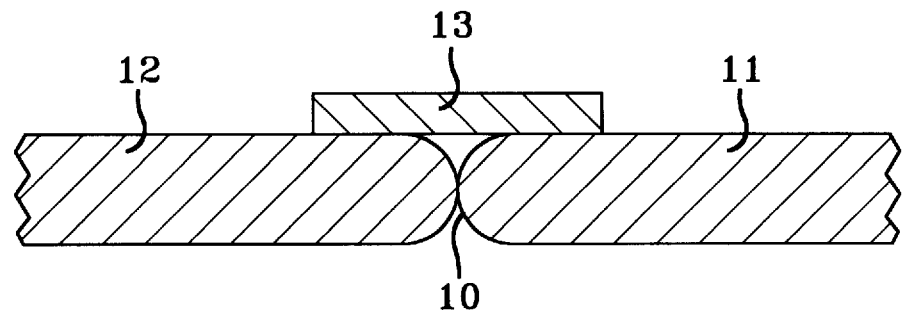
FIG. 1 is a cross-sectional view of a butt splice covered with a layer of syndiotactic 1,2-polybutadiene in accordance with methods of the invention.

The invention is directed toward methods for securing splices in curable rubber articles. Examples of curable rubber articles useful in the invention include, tires, hoses, conveyor belts, tubes, bladders and belts. Applicants have found that, by covering splices with syndiotactic 1,2-polybutadiene in these types of rubber articles, splices can be secured for the useful life of the article. In addition, Applicants have found that, when methods of the invention are utilized, rubber compounds of which rubber articles are made do not have to contain syndiotactic 1,2-polybutadiene.

Rubber Compounds

Any type of uncured, but curable, rubber article, or component thereof, made from a rubber compound containing any unsaturated rubber that is sulfur-curable is useful in methods of the invention. Rubber compounds useful in the invention typically contain natural rubber and/or synthetic rubber, carbon black, oil, curing agents and accelerators.

These types of rubber compounds are well known for making rubber articles, such as tires, belts, hoses, conveyor belts, tubes and bladders.

For example, uncured rubber compounds disclosed in U.S. Pat. No. 5,160,383, which issued on Nov. 3, 1992, and which is hereby incorporated by reference, are useful in methods of the invention. In general, rubber compounds having a higher level of unsaturation have a greater number of potential cross-link sites and a higher probability of bonding with syndiotactic 1,2-polybutadiene placed on and/or near splices in rubber articles. Thus, using rubber compounds having higher degrees of unsaturation are most preferred in methods of the invention.

Syndiotactic 1,2-Polybutadiene

In general, any type of syndiotactic 1,2-polybutadiene that can be vulcanized with unsaturated rubber compounds is useful in the present invention. For example, the syndiotactic 1,2-polybutadiene disclosed in U.S. Pat. No. 5,278,263, which issued on Jan. 11, 1994, and which is hereby incorporated by reference, is useful in the invention. The syndiotactic 1,2-polybutadiene can be used in methods of the invention in any form that facilitates covering the splice and two ends that are joined. For example, the syndiotactic 1,2-polybutadiene can be applied as a powder, liquid or sheet to the rubber compound.

Preferably, syndiotactic 1,2-polybutadiene polymers having a melting point of at least about 150° C. and not greater than about 175° C. are used in the invention. With this range of melting temperatures, the syndiotactic 1,2-polybutadiene can efficiently be adhered to the rubber compound using heat and pressure.

In addition, Applicants have found that syndiotactic 1,2-polybutadiene having a vinyl content on average of at least about 80 percent by number and of not greater than about 95 percent is most preferred. By "vinyl content," it is meant the weight percent of the polymer which has the vinyl structure.

Preferably, the syndiotactic 1,2-polybutadiene used in the invention also has a crystallinity of at least about 40 percent and of not greater than about 60 percent. Preferred syndiotactic 1,2-polybutadiene compounds have these characteristics in order to insure that the syndiotactic 1,2-polybutadiene used in the invention is sufficiently thermoplastic for methods of the invention. An example of syndiotactic 1,2-polybutadiene that is useful in the invention is disclosed in U.S. Pat. No. 5,307,850, which issued on May 3, 1994, and which is hereby incorporated by reference.

Most preferably, the syndiotactic 1,2-polybutadiene used in the invention is extruded into sheets and cut into strips that are wide enough to comfortably cover and secure splices. If the strips are too wide, then the amount of syndiotactic 1,2-polybutadiene used is in excess and economic efficiency is reduced. If the strips are too narrow, then the splice may not be secure and separation can occur. Typically, the width of each strip is at least about 0.250 of an inch (6.35 mm) and not greater than about 0.375 of an inch (9.52 mm).

The length of these strips varies with the length of the splice to be secured. Generally, with respect to a ply splice in a tire, for example, it is preferred that the length of the strips is about 1 mm longer than the width of the splice at each end.

Securing the Splices

Generally, methods of the invention are performed during construction of curable rubber articles. It is during construction that rubber components are configured to form rubber articles, and the configuration process typically involves splicing two ends of rubber components together.

Figure 2:
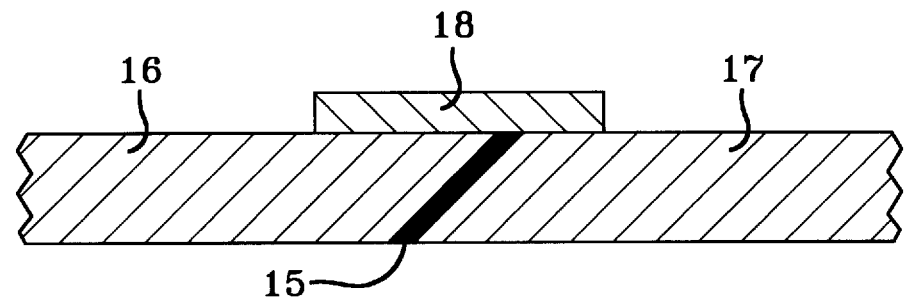
FIG. 2 is a cross-sectional view of a skived splice covering a layer of syndiotactic 1,2-polybutadiene in accordance with methods of the invention.

In accordance with the invention, once two ends of a rubber component are adjoined, syndiotactic 1,2-polybutadiene is applied to the rubber component in such a matter that it covers the splice and two ends of the rubber component. FIGS. 1 and 2 show a cross-sectional view of a splice covered by a layer of syndiotactic 1,2-polybutadiene. FIG. 1 shows a butt splice 10 created by adjoining two ends of uncured rubber 11 and 12. Butt splice 10 is covered by a strip of syndiotactic 1,2-polybutadiene 13. Once applied, strip 13 is adhered to the uncured rubber, preferably using heat and pressure, in accord with the invention. This adhering step tends to secure strip 13 and to minimize the potential for non-uniformities caused by strip 13.

FIG. 2 shows a skived splice 15 created by adjoining two ends of uncured rubber 16 and 17. Skived splice 15 is covered by a strip of syndiotactic 1,2-polybutadiene 18. Once applied, strip 18 is adhered, preferably using heat and pressure in accordance with the invention. The two types of splices shown in the Figures are merely exemplary of the splices in which methods of the invention may be used.

Once applied, typically, heat and pressure are used to melt the syndiotactic 1,2-polybutadiene to adhere it to the rubber compound. Enough heat and pressure are used to sufficiently melt the syndiotactic 1,2-polybutadiene. If too little heat and pressure are used, then the syndiotactic 1,2-polybutadiene may not penetrate into the rubber compound and, thus, not have sufficient mechanical adhesion to hold the splice together. Enough heat and pressure are applied to the syndiotactic 1,2-polybutadiene to melt it as observed by the human eye. Typically, it takes about 5 to 10 seconds for the syndiotactic 1,2-polybutadiene to melt, if it is in a strip form, having a thickness of 0.010 inch. Any type of heating and pressing mechanism known in the art for spot-heating elastomers can be used to heat the syndiotactic 1,2-polybutadiene. For example, a heated steel bar containing a number of cartridge rod heaters can be used. The cartridge rod heaters facilitate uniform heating of the syndiotactic 1,2-polybutadiene.

Once melted, the syndiotactic 1,2-polybutadiene should be allowed to cool to a temperature below its melt temperature. Then, when the rubber article is cured, the syndiotactic 1,2-polybutadiene can be vulcanized with the rubber compound that is included in the rubber article. The rubber article can be vulcanized using methods known in the art.

In accordance with methods of the invention, once the syndiotactic 1,2-polybutadiene is melted, there are no visible bulges or non-uniform spots in its proximity.

Splices secured using methods of the invention, generally, have no separation visible to the human eye either before or after vulcanization for the useful life of the rubber article. Furthermore, rubber articles, such as tires, having splices secured using methods of the invention eventually failed, after rigorous testing, in sections of the rubber article other than at the splices secured using methods of the invention.

In addition, as detailed in the example below, rubber articles containing splices secured using methods of the invention did not exhibit any uniformity problems caused by reinforcement of the splices with syndiotactic 1,2-polybutadiene.

The example below is illustrative of the invention and is not intended to limit the invention in any way.

EXAMPLE

Syndiotactic 1,2-polybutadiene having a melting point in the range of about 150° C. to about 175° C. was compounded with sulfur and accelerators and calendered to a sheet having a thickness of 0.010 of an inch (0.254 mm). The syndiotactic 1,2-polybutadiene used was made in accordance with U.S. Pat. No. 5,011,896, which issued on Apr. 30, 1991, and is hereby incorporated by reference. The calender rolls used to calender the syndiotactic 1,2-polybutadiene were heated to about 140° C. to melt the syndiotactic 1,2-polybutadiene and mix it with the sulfur and accelerators. Sulfur in an amount of 2.5 parts by weight, zinc oxide in an amount of 2.0 parts by weight, benzothiazyl disulfide in an amount of 0.4 parts by weight and 2-(4-morpholenyl dithio)benzothiazole in an amount of 1.5 parts by weight were mixed with the syndiotactic 1,2-polybutadiene.

This calendered sheet was cut into nine strips having a width of about 0.250 of an inch (6.35 mm) to about 0.375 of an inch (9.52 mm). The length of each strip mirrored the length of the splice to be secured. Each of the nine strips was placed over a butt splice of two ends of a ply component used in the construction of an automobile tire.

A piece of Mylar™ plastic was placed on top of each strip before heating and pressing each strip. The plastic prevented the heating equipment from sticking to the syndiotactic 1,2-polybutadiene and rubber compound.

A heated roller having a temperature of between 140° C. to 155° C. inclusive was used to apply heat and pressure to the strip having Mylar™ plastic thereon. The heated bar remained in contact with the strip until the syndiotactic 1,2-polybutadiene was melted as observed by the human eye. Human pressure was applied for about 5 to 15 seconds until the syndiotactic 1,2-polybutadiene was melted. After sufficient heat and pressure were applied to melt each strip and to adhere it to the butt splice, the strip was allowed to cool to room temperature and the Mylar™ plastic was removed. At this point, the strip was mechanically bonded to the two ply ends.

Nine 13-inch automobile passenger tires were built using the ply component having its butt splices secured using the syndiotactic 1,2-polybutadiene strip as described above. While the tires were being constructed, no visible stretching or detachment of the butt splices was observed with the human eye. The nine tires were then cured in a tire curing press using conventional tire curing conditions and equipment.

Because the syndiotactic 1,2-polybutadiene strips have some unsaturation, they are sulfur-curable and compatible with materials frequently found in tires. No bulges or delaminations were observed in the areas of the splices subsequent to the cure process. The nine tires were tested for radial force variation and no defects from the syndiotactic 1,2-polybutadiene reinforced butt ply splices were detected.

The nine tires were also mounted on wheels and run against a load wheel until failure.

All failures in the tires were not in the vicinity of the syndiotactic 1,2-polybutadiene reinforced butt ply splice. The nine tires were then cut and inspected at the ply splice locations. No delamination or separation of the splices or strips was visible to the human eye.

The above specification and example provide a complete description of the invention. Since many embodiments of the invention can be made without departing from the spirit and scope of the invention, the invention resides in the claims hereinafter appended.

What is claimed is:

1. A method of securing a splice between two ends of curable rubber, said method comprising steps of:
    (a) covering the splice and two ends of uncured rubber with syndiotactic 1,2-polybutadiene in the form of a powder; and
    (b) adhering the syndiotactic 1,2-polybutadiene to the uncured rubber, wherein the uncured rubber does not have syndiotactic 1,2-polybutadiene formulated therein.

2. A method of claim 1 wherein the step of covering comprises covering the splice and two ends of uncured rubber with a layer of syndiotactic 1,2-polybutadiene that is at least about 0.005 of an inch thick and is not greater than about 0.020 of an inch thick.

3. A splice resulting from a method of claim 2.

4. A method of claim 1 wherein the step of adhering comprises melting the syndiotactic 1,2-polybutadiene.

5. A method of claim 4 wherein the syndiotactic 1,2-polybutadiene is melted at a temperature of at least about 150° C. and not greater than about 175° C.

6. A method of claim 5 wherein the syndiotactic 1,2-polybutadiene is melted in not more than 10 seconds.

7. A splice resulting from a method of claim 5.

8. A method of claim 1 wherein the step of adhering comprises applying pressure to the syndiotactic 1,2-polybutadiene.

9. A method of claim 1 wherein the splice is a butt splice.

10. A butt splice resulting from a method of claim 9.

11. A method of claim 1 wherein the splice is a skived splice.

12. A splice resulting from a method of claim 1.

* * * * *